US007035836B2

(12) United States Patent
Caponetto et al.

(10) Patent No.: US 7,035,836 B2
(45) Date of Patent: Apr. 25, 2006

(54) METHOD AND APPARATUS FOR CONTROLLING A VEHICLE SUSPENSION SYSTEM BASED ON SKY HOOK APPROACH

(75) Inventors: Riccardo Caponetto, Catania (IT); Olga Diamante, Siracusa (IT); Antonino Risitano, Aci Catena (IT); Giovanna Fargione, Catania (IT); Domenico Tringali, Augusta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 599 days.

(21) Appl. No.: 10/115,887

(22) Filed: Apr. 3, 2002

(65) Prior Publication Data

US 2002/0185827 A1 Dec. 12, 2002

(30) Foreign Application Priority Data

Apr. 4, 2001 (EP) .................................. 01830233

(51) Int. Cl.
*G06N 5/02* (2006.01)
(52) U.S. Cl. .................... 706/47; 706/900; 706/14
(58) Field of Classification Search ................. 706/47, 706/900, 14; 701/37
See application file for complete search history.

(56) References Cited

U.S. PATENT DOCUMENTS

| 4,936,423 A | 6/1990 | Karnopp ..................... 188/299 |
| 5,383,124 A | 1/1995 | Kunz et al. ............. 364/424.05 |
| 5,928,297 A | 7/1999 | Murata et al. ................. 701/37 |
| 5,931,879 A | 8/1999 | Neumann et al. .............. 701/37 |
| 2001/0044685 A1 * | 11/2001 | Schubert ....................... 701/50 |

FOREIGN PATENT DOCUMENTS

| DE | 39 30 517 A1 | 1/1991 |
| EP | 0 499 790 A2 | 8/1992 |
| EP | 0 538 965 A2 | 4/1993 |
| EP | 1 018 445 A2 | 7/2000 |
| EP | 1 063 108 A1 | 12/2000 |

OTHER PUBLICATIONS

Angela K. Carter, Transient Motion Control of Passive and Semiactive Damping for Vehicle Suspensions, Jul., 15, 1998, Virginia Polytechnic Institute and State University, Thesis, 1-104.*

(Continued)

*Primary Examiner*—Joseph P. Hirl
(74) *Attorney, Agent, or Firm*—Lisa K. Jorgenson; Harold H. Bennett, II; Seed IP Law Group PLLC (57) ABSTRACT

A method for controlling a vehicle semi-active suspension system comprising at least one suspension, providing for: detecting vehicle dynamic quantities during the vehicle ride; using the detected dynamic quantities, determining an index of ride comfort and an index of roadholding; applying a weight factor to the index of ride comfort and to the index of roadholding and, based on a Sky Hook control model, determining a target damping force characteristics for the at least one suspension of the suspension system; controlling the at least one suspension to put the respective damping force characteristics in accordance with the calculated target damping force characteristics. The weight factor is calculated dynamically during the vehicle ride, by means of a fuzzy calculation on the detected vehicle dynamic quantities.

19 Claims, 3 Drawing Sheets

OTHER PUBLICATIONS

Riccardo Caponetto, A Soft Computing Approach to Fuzzy Sky-Hook Control of Semiactive Suspension, 2003, IEEE, 786-798.*

Jukka-Pekka Hyvarinen, The Improvement of Fully Vehicle Semi-active Suspension through Kinematical Model, 2004, University of Oulu, Finland, Dissertation, 1-157.*

* cited by examiner

METHOD AND APPARATUS FOR CONTROLLING A VEHICLE SUSPENSION SYSTEM BASED ON SKY HOOK APPROACH

BACKGROUND OF THE INVENTION

1. Field of the Invention

The present invention relates to a method for controlling a vehicle suspension system, and to an apparatus suitable for actuating the method. In particular, the invention concerns a method and a related apparatus for controlling the damping force characteristic of shock absorbers in a semi-active vehicle suspension system, based on the Sky Hook control theory.

2. Description of the Related Art

The suspension system of a vehicle is intended to perform several functions, such as sustaining the vehicle over the road or, more generally, the ground, keeping the vibrations transmitted to the vehicle body (for example, in the case of a car, the passenger compartment or car body) as low as possible, distributing the forces arising from accelerations, due for example to an increase or a decrease in the vehicle speed and/or to changes in the vehicle ride direction.

Several types of suspension systems have been proposed, which can be grouped in three main categories: passive suspension systems, active suspension systems and semi-active suspension systems.

In passive suspension systems, the shock absorbers have a fixed damping coefficient. In active suspension systems, the shock absorbers have a variable damping coefficient, which can be varied continuously under the control of a control system, for example by means of suitably controlled hydraulic pumps. Active suspension systems can thus perform the above-mentioned functions adapting to the particular ride conditions.

In semi-active suspension systems, similarly to active suspension systems, the damping coefficient of the shock absorbers can be varied continuously under the control of a control system, so as to adapt to the particular ride conditions. However, while in active suspension systems it can be necessary to supply external energy to the shock absorbers to control the damping force characteristic thereof, this is not so in semi-active suspension systems, wherein the control is only directed to properly dissipating the energy of the shock absorbers.

Semi-active suspension systems represent an intermediate solution between passive and active suspension systems, providing better performance than the former without being so expensive as the latter.

Figures 1, 2, 3:
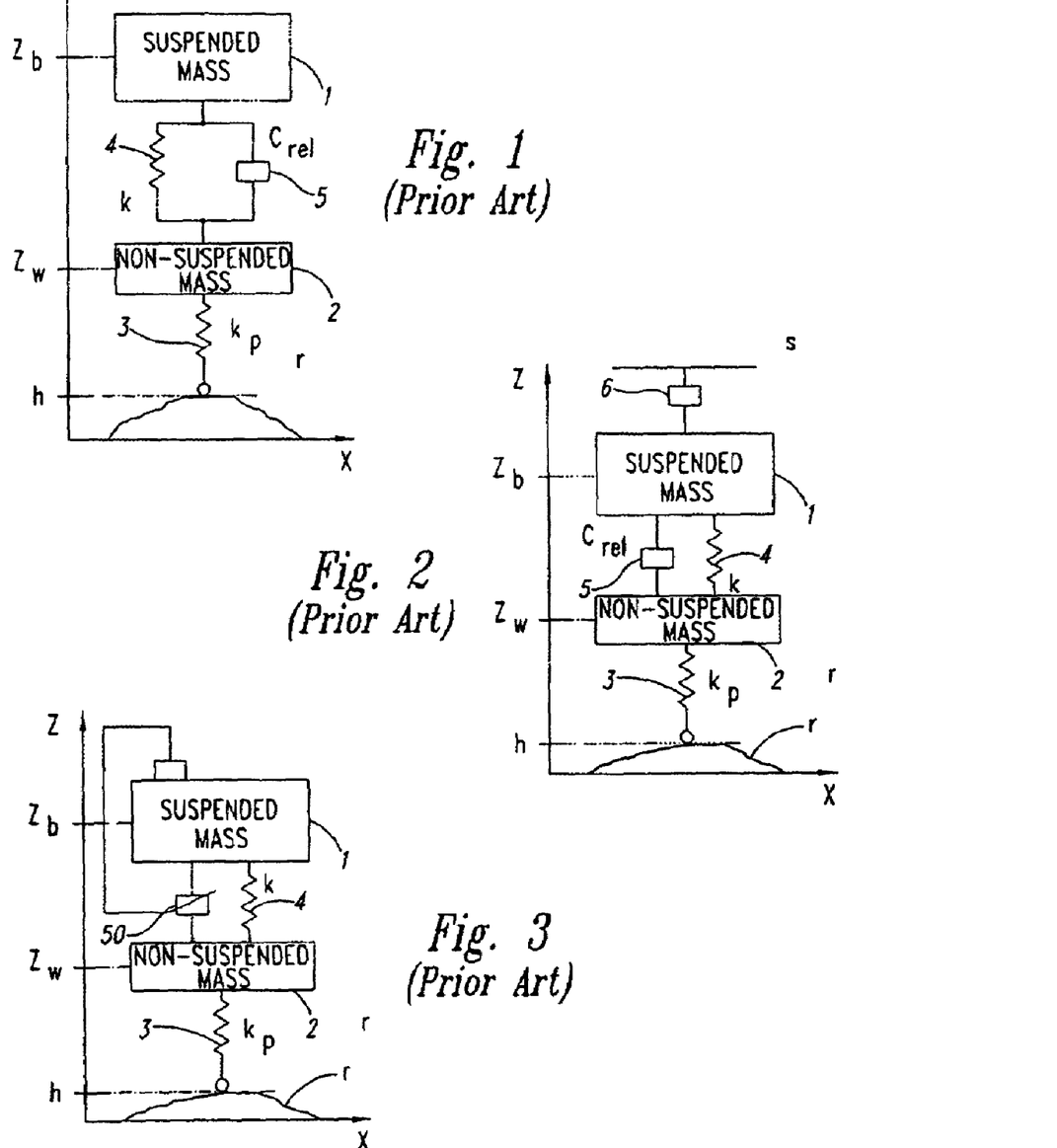
FIG. 1 depicts a model of a passive suspension system.
FIG. 2 depicts an ideal model of a suspension system based on the Sky Hook approach.
FIG. 3 depicts a practical model of the Sky Hook suspension system of FIG. 2.

The behavior of a passive suspension system including one suspension can be determined using for example the De Carbon model. Such a model, depicted in FIG. 1, is a system with two degrees of freedom, and is for example suitable to represent one fourth (that is, one wheel) of a four-wheels vehicle such as a car. The model system includes a suspended mass 1, of mass M, representing the mass of the car body, and a non-suspended mass 2, of mass m, representing the mass of the wheel. Neglecting the damping effect of the tire, the non-suspended mass m is coupled to ground (the road surface r) by a spring 3 of rigidity kp, corresponding to the tire rigidity. The suspended mass 1 is coupled to the non-suspended mass 2 by means of the suspension, which comprises a spring 4 of rigidity k and a shock absorber 5 having a constant damping coefficient Crel.

Applying the D'Alembert principle to the model system of FIG. 1, the following mathematical model of the suspension can be derived:

$$M \cdot \ddot{z}_b = -k \cdot (z_b - z_w) - C_{rel} \cdot (\dot{z}_b - \dot{z}_w)$$

$$m \cdot \ddot{z}_w = k \cdot (z_b - z_w) - k_p \cdot (z_w - h) + C_{rel} \cdot (\dot{z}_b - \dot{z}_w)$$

where $z_b$ is vertical coordinate of the suspended mass 1 (the car body) with respect to an arbitrary reference level, $z_w$ is the vertical coordinate of the non-suspended mass 1 (the wheel) and h is the height of the road surface r with respect to said reference level. The second time derivative of $z_b$, i.e., the vertical acceleration of the car body, can be adopted as an index of ride comfort assured by the suspension: the lower the vertical acceleration of the car body, the higher the ride comfort. The force exerted by the non-suspended mass 2 (the wheel) onto the road surface r can be adopted as an index of roadholding: the higher the force exerted by the wheel onto the road surface, the higher the car holding of the road. Alternatively, the variation in time of the force exerted by the wheel onto the road during the vehicle ride can be adopted as an index of roadholding.

The limitations of the passive suspension system stems from the fact that only one parameter, i.e., the damping coefficient Crel of the shock absorber, is available for adjusting the two indexes of comfort and roadholding. Since the two requirements are independent from each other, and since the minima of the two indexes are achieved for different values of the shock absorber damping coefficient Crel, the system does not have an optimum solution, and merely a trade-off solution can be found.

In principle, this problem can be solved by increasing the number of system parameters, that is, making the shock absorber damping force to depend on more than a single parameter. One way to do so is represented by the Sky Hook approach.

In a suspension system based on the Sky Hook approach the force exerted by the shock absorber onto the car body is proportional to the absolute speed of the car body with respect to an inertial reference system, and to the relative speed between the car body and the wheel.

Still in principle, as the inertial reference system either the earth or the sky can be taken. However, since the suspended mass cannot be connected to the earth, the sky is chosen as the inertial reference system and the suspended mass is ideally assumed to be hooked to the sky. The corresponding system model is depicted in FIG. 2, where s indicates the sky inertial reference system and 6 denotes a shock absorber of damping coefficient Csky connecting the suspended mass 1 to the sky s.

A Sky Hook damper is merely an ideal device, since it is clearly not possible to couple the suspended mass 1 to the sky. In the practice, a Sky Hook suspension can be implemented by replacing the shock absorber 5, having a fixed damping coefficient Crel, with a shock absorber 50 having a variable damping coefficient, and providing a feedback control from the car body 1 to the shock absorber 50, thus obtaining the model depicted in FIG. 3.

Applying again the D'Alembert principle to the system depicted in FIG. 3, the resulting mathematical is the following:

$$M \cdot \ddot{z}_b = -k \cdot (z_b - z_w) - F_{am}$$

$$m \cdot \ddot{z}_w = k \cdot (z_b - z_w) - k_p \cdot (z_w - h) + F_{am}$$

where Fam is the force exerted by the shock absorber 50 on the car body 1. The force Fam which, as previously mentioned, must be proportional to the absolute speed of the car body 1 with respect to an inertial reference system and to the relative speed between the car body 1 and the wheel 2 is given by:

$$F_{am}(t)=C_{rel}(t)\cdot V_{rel}(t)+C_{sky}(t)\cdot V_{abs}(t)=C_{rel}\cdot(\dot{z}_b-\dot{z}_w)+C_{sky}\cdot\dot{z}_b$$

having indicated as Vrel the relative vertical speed between the car body 1 and the wheel 2, and as Vabs the absolute vertical speed of the car body 1. The time dependence of the damping coefficients Crel and Csky has also been explicitly shown.

It follows that two parameters are now available for controlling the suspension, that are the damping coefficients Crel and Csky.

The Sky-Hook control technique can be implemented both in active and in semi-active suspension systems. Since, as mentioned before, in a semi-active suspension system, differently from active suspensions systems, no external energy is supplied to the suspension system but rather the energy of the suspension system itself is dissipated in a controlled way, in a semi-active suspension system the shock absorber 50 applies no force to the car body 1 when such a force should be opposite to the relative speed of the car body 1 with respect to the wheel 2.

Consequently, while in both the active and semi-active suspension systems is:

$$F_{am}=C_{rel}\cdot(\dot{z}_b-\dot{z}_w)+C_{sky}\cdot\dot{z}_b \text{ for } F_{am}\cdot(\dot{z}_b-\dot{z}_w)>0$$

the semi-active suspension system has the following additional limitation:

$$F_{am}=0 \text{ for } F_{am}\cdot(\dot{z}_b-\dot{z}_w)<0$$

Conventional Sky Hook suspension control methods provide for choosing the pair of parameters Crel and Csky in such a way as to find a trade-off between the contrasting requirements of minimizing the car body vertical acceleration, so as to maximize the comfort index, and minimizing the variation of the force exerted by the wheel on the road surface, so as to maximize the index of roadholding.

A weight factor p is determined which is used to weight the two contributes; by introducing the weight factor p, the function to be minimized becomes:

$$F_{opt}=p\cdot(M\cdot\ddot{z}_b)+(1-p)\cdot F_{gnd}$$

where by Fgnd the variation of the force exerted by the wheel onto the road is indicated.

Once a value for the weight factor p has been chosen, the values for the damping coefficients Crel and Csky can be univocally determined by minimizing (i.e., searching the minimum) the function $F_{opt}$. The choice of the value for the weight factor p determines the type of driving style; changing the value of the weight factor p, either the ride comfort or the roadholding can be privileged.

Up to now, in the implementation of the sky Hook control approach in semi-active suspension systems the value of the weight factor p has been fixed a priori, and the values for the damping coefficients Crel and Csky univocally determined on the basis of the value of the weight factor p by using conventional control systems, like P-I-D (Proportional-Integral-Derivative) controllers.

BRIEF SUMMARY OF THE INVENTION

In view of the state of the art described, an embodiment of the present invention provides a new method, and a new related apparatus, for controlling a vehicle suspension system, capable of providing better results compared to the conventional control method and apparatus.

According to an embodiment of the invention, a control method comprises:

detecting vehicle dynamic quantities during the vehicle ride;

using the detected dynamic quantities, determining an index of ride comfort and an index of roadholding;

applying a weight factor to the index of ride comfort and to the index of roadholding and, applying a Sky Hook control model, determining a target damping force characteristics for a suspension of the suspension system;

controlling the suspension to put the respective damping force characteristics in accordance with the calculated target damping force characteristics.

The weight factor is calculated dynamically during the vehicle ride, using the detected dynamic quantities.

In a preferred embodiment, the weight factor is calculated by means of a fuzzy calculation on the detected vehicle dynamic quantities.

Also according to the invention, a control apparatus is provided.

The control apparatus comprises a control system adapted to receive detected vehicle dynamic quantities during the vehicle ride. The control system comprises:

means for determining an index, of ride comfort and an index of roadholding on the basis of the detected dynamic quantities;

calculating means for applying a weight factor to the index of ride comfort and to the index of roadholding and, based on a sky Rook control model, determining a target damping force characteristics for the suspension of the suspension system;

control means for controlling the suspension to put the respective damping force characteristics in accordance with the calculated target damping force characteristics.

The calculating means calculates the weight factor dynamically during the vehicle ride, using the detected dynamic quantities.

In a preferred embodiment, the calculating means comprises a fuzzy controller that dynamically calculates the weight factor, on the basis of a prescribed set of fuzzy rules applied to the detected vehicle dynamic quantities.

BRIEF DESCRIPTION OF THE SEVERAL VIEWS OF THE DRAWINGS

The features and advantages of the present invention will be made apparent by the following detailed description of an embodiment thereof, illustrated merely by way of a non-limiting example in the annexed drawings, wherein.

DETAILED DESCRIPTION OF THE INVENTION

Figure 4:
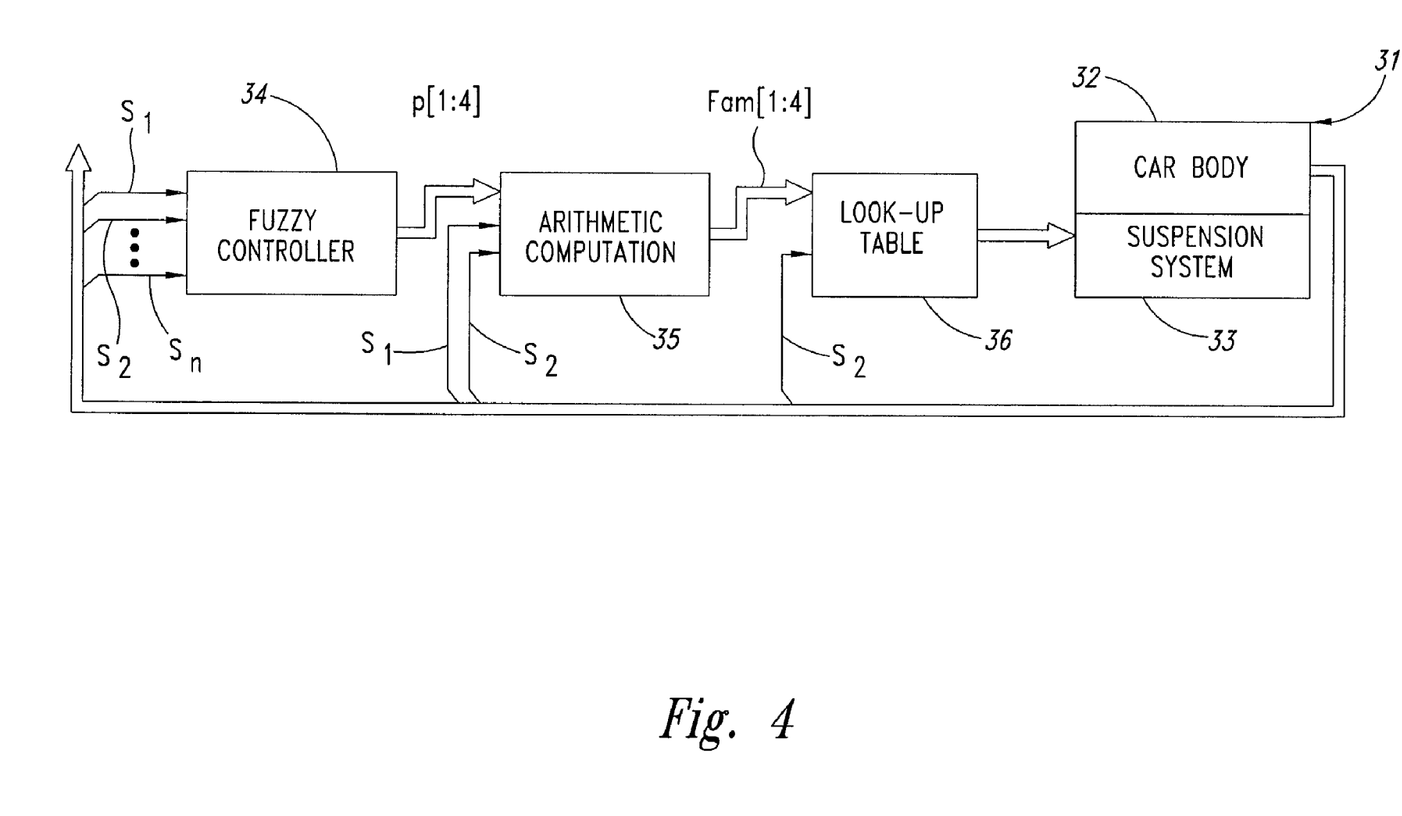
FIG. 4 is a schematic view of a suspension control apparatus according to the present invention.

Referring to FIG. 4, reference numeral 31 is used to identify a vehicle, for example, a car, having a car body 32 and a suspension system 33 comprising, for example, four wheels with respective suspensions (not shown in detail).

The car 31 is equipped with sensors (not shown) capable of detecting dynamic quantities such as, for example, the car speed, the steering angle, the car roll, the pitch, the vertical displacement, the shock absorber elongations. Sensor signals S1, S2, ..., Sn generated by such sensors are supplied to a suspension control system comprising a fuzzy controller 34, a computation block 35 and a look-up table 36.

The fuzzy controller 34 receives the sensor signals S1, S2, ..., Sn and, on the basis of the detected quantities, dynamically determines, by means of a fuzzy computation, four values p[1] ... p[4] for the weight factor for each of the vehicle suspensions. Such values are supplied to the arithmetic computation block 35. The arithmetic computation block 35 is also supplied with the sensor signals S1 and S2, carrying information relating to the car body absolute vertical speed with respect to the road (ground), and the car body relative vertical speed with respect to the wheels. On the basis of the weight factors p[1] ... p[4] determined by the fuzzy controller 34, of the car body absolute vertical speed with respect to the ground and of the car body relative vertical speed with respect to the wheels, the arithmetic computation block 35 calculates, for each of the suspensions, the value of the force Fam[1:4] (i.e., the force exerted by a suspension on the car body) using the previously reported formula:

$$F_{opt}[1:4] = p[1:4] \cdot (M \cdot \ddot{z}_b) + (1-p[1:4]) \cdot F_{gnd}[1:4]$$

where $F_{opt}[1:4]$ identifies four functions to be minimized (one for each suspension) and Fgnd[1:4] identifies the variation of the force exerted by the each one of the four wheels on the ground.

In particular, the arithmetic computation block 35 calculates, for each of the four functions Fopt[1:4], the respective minimum, thereby determining four pairs of values (Crel, Csky), one pair for each suspension. In an embodiment of the invention, root-mean-square (RMS) values of the car body vertical acceleration and of the variation of the force exerted by the wheels onto the ground are used; preferably, the RMS values are normalized.

By way of example only, the following table reports possible pairs of values of the damping coefficients Crel[i] and Csky[i] corresponding to different values of the weight factor p[i], in respect of one of the four suspensions:

| p[i] | Crel[i] (Ns/m) | Csky[i] (Ns/m) |
|---|---|---|
| 0 | 2,360 | 1,540 |
| 0.1 | 1,640 | 2,770 |
| 0.3 | 923 | 5850 |
| 0.5 | 615 | 6000 |

The calculated four pairs of values (Crel, Csky) are used by the arithmetic computation block 35 to determine four values Fam[1:4], representing the target force that each suspension should exert on the car body, using the previously reported formula:

$$F_{am}[1:4] = C_{rel} \cdot (\dot{z}_b - \dot{z}_w[1:4]) + C_{sky} \cdot \dot{z}_b$$

The values Fam[1:4] and the car body relative vertical speed with respect to the wheel are supplied to the look-up table 36 which, on the basis of these values, determines the electrical control quantities suitable to drive the electrically controlled suspensions, which can be for example fluidodynamic suspensions or magnetorologic suspensions.

A practical implementation of the fuzzy controller 34 will be now described by way of example; for the sake of simplicity, the single suspension system of FIG. 3 will be considered.

The input variables to the fuzzy controller 34 can be the following:

in1: vertical acceleration of the suspended mass 1 (in m/s$^2$);

in2: relative vertical speed of the suspended mass 1 with respect to the non-suspended mass 2 (in m/s).

As shown in FIG. 4, the output variable of the fuzzy controller 34 is the weight factor p, that is the ratio between the damping coefficients Crel and Csky. Assuming by way of example that the damping coefficient Csky is kept constant at a prescribed value, the force Fam is given by:

$$F_{am}(t) = C_{rel}(t) + C_{sky} \cdot V_{abs}(t)$$

and the output variable out of the fuzzy controller 34 is the damping coefficient Crel (in Ns/m).

The Applicant has observed that by keeping the damping coefficient Csky constant at a prescribed value, the control logic can be simplified. In the choice of the value for Csky the Applicant has observed that it is better to choose a relatively high value: the Applicant has in fact observed that the contribution of the damping coefficient Csky to the overall damping force depends on the absolute vertical speed of the suspended mass, which becomes high only at the resonance frequencies, and at such frequencies the shock absorber must develop a higher damping force. Suitable values for the damping coefficient Csky which the Applicant has experimentally obtained in the case of a four-wheel vehicle, such as a car, are approximately 5800–5900 Ns/m for the front wheels, and 4550–4650 Ns/m for the rear wheels. However, neither these values nor the choice of keeping the damping coefficient Csky constant are to be intended as limitative for the present invention; greater control flexibility is achieved if also the value of Csky is determined dynamically, instead of being kept constant.

Figure 5:
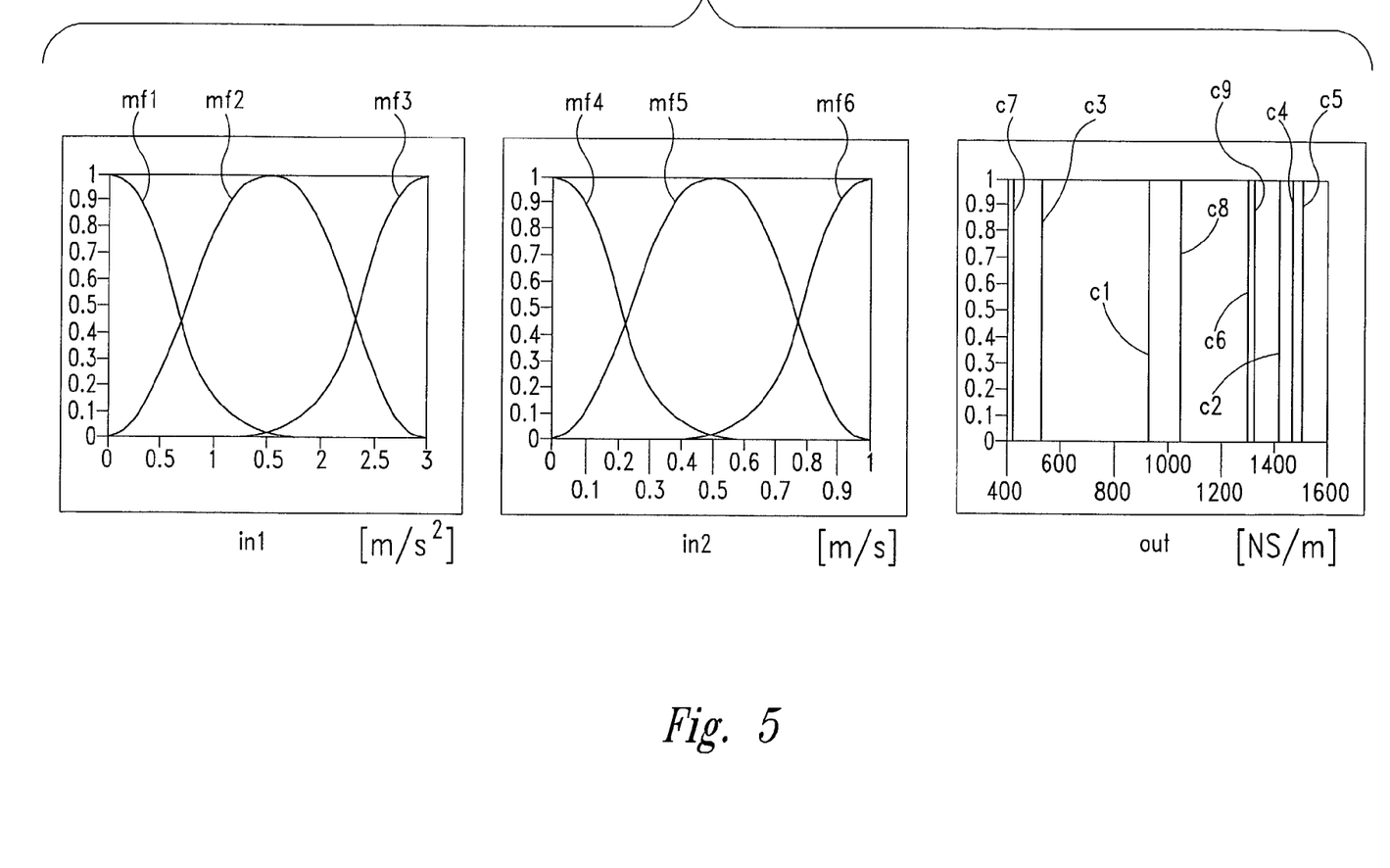
FIG. 5 shows possible membership functions for the input and output variables of a fuzzy controller of the control apparatus of FIG. 4, in an example of a suspension system including a single suspension.

A suitable set of membership functions implemented by the fuzzy controller 34 for the fuzzification of the two input variables in1, in2 is depicted in FIG. 5. Membership functions mf1, mf2 and mf3 determine the fuzzy values of the input variable in1, assumed to range from 0 to 3 m/s$^2$; membership functions mf4, mf5 and mf6 determine the fuzzy values of the input variable in2, assumed to range from 0 to 1 m/s. By way of example, all the fuzzy functions are gaussian.

The fuzzy controller 34 can for example use the following set of rules:

R1: IF(in1 IS mf1) AND (in2 IS mf4) THEN (out IS C1)
R2: IF (in1 IS mf1) AND (in2 IS mf5) THEN (out IS C2)
R3: IF (in1 IS mf1) AND (in2 IS mf3) THEN (out IS C3)
R4: IF (in1 IS mfg) AND (in2 IS mf4) THEN (out IS C4)
R5: IF (in1 IS mfg) AND (in2 IS mf5) THEN (out IS C5)
R6: IF (in1 IS mfg) AND (in2 IS mf6) THEN (out IS C6)
R7: IF (in1 IS mf3) AND (in2 IS mf4) THEN (out IS C7)
R8: IF (in1 IS mf3) AND (in2 IS mf5) THEN (out IS CS)
R9: IF (in1 IS mf3) AND (in2 IS mf6) THEN (out IS C9)

where C1 to C9 are membership functions for the output variable out of the fuzzy controller 34.

A possible set of membership functions C1 to C9 for the output variable out is shown in the rightmost diagram of FIG. 5. In the shown example, the membership functions C1 to C9 are crisp values.

In order to determine the crisp value for the output variable out, the fuzzy controller 34 performs a defuzzification process, for example, adopting the centroid or the barycenter methods.

It is to be noted that the gaussian shape of the membership functions mf1 to mf6 is not a limitation, and other shapes could be used, for example, trapezoidal.

Also, the output variable out, instead of crisp values, could be defined by membership functions of different shapes, such as gaussian or trapezoidal.

Based on the value of the variable out calculated by the fuzzy controller 34, the arithmetic computation block 35 determines the value of the force Fam; this value is supplied to the look-up table 36, which generates the electric control signals suitable to drive the suspension. As already mentioned, different types of suspensions can be used, for example the magnetoroligic suspensions or the fluidodynamic ones, if necessary changing the drivers thereof which act under control of the look-up table 36.

Advantageously, the fuzzy controller 34 can be optimized by using genetic algorithms which, as known, represent an optimization method based on the Darwin's natural evolution principle. According to this method, within a population in continuous evolution, the individual who best adapts to the environmental constraints corresponds to the optimal solution of the problem to be solved.

In the implementation of the genetic algorithm method for optimizing a fuzzy controller for a car suspension system, the overall acceleration of the car body has been taken as an index of performance (target function to be optimized). In order to compare the RMS (Root Mean Square) value of the car body acceleration to the RMS value of the variation of the force exerted onto the road surface, for each one of the four wheels (the so-called corners) the force variations have been divided by the suspended mass related to said corner, for example 300 Kg.

The target function to be optimized is the following:

$$Ob = a \cdot N(\text{acc}) + b \cdot N(\text{rdh})$$

where a and b are two constant parameters. For example, assuming that a slightly sport behavior is desired for the car, the parameters a and b can be respectively equal to 0.3 and 0.7.

N(acc) is a dimensionless quantity representing the normalized acceleration of the car body:

$$N(\text{acc}) = n1 \cdot N(\text{vert}) + n2 \cdot N(\text{pitch}) + n3 \cdot N(\text{roll})$$

where N(vert) is the normalized vertical acceleration, N(pitch) is the normalized pitch acceleration and N(roll) is the normalized roll acceleration. n1, n2 and n3 are three coefficients the choice of which depends on considerations relating to the higher or lower effect of either one of the three accelerations on the comfort. Suitable values are for example n1=0.4, n2=0.5 and n3=0.1.

N(rdh) is a dimensionless quantity representing the normalized roadholding, given by:

$$N(\text{rdh}) = \Sigma q_i \cdot RMS(T_i)/300$$

where RMS(Ti), i=1 . . . 4, are the normalized RMS values of variation of the force exerted onto the road surface by the four wheels, and qi are four weight factors for weighting the four RMS value contributions, one for each wheel. For example, it can be taken qi=0.25 for each of the four wheels.

The total number of variables is 84: for each one of the four corners 21 variables exist, which are the two inputs in1, in2 with three gaussian membership functions (which are characterized by two quantities: mean and width), the nine fuzzy rules, the nine singletons for the output out. For simplicity, only the nine singletons can be optimized, obtaining the values depicted in FIG. 5.

The fuzzy controller 34, the computation block 35 and the look-up table 36 can be practically implemented using a microprocessor.

Although the present invention has been disclosed and described by way of an embodiment, it is apparent to those skilled in the art that several modifications to the described embodiment, as well as other embodiments of the present invention are possible without departing from the spirit or essential features thereof, as defined in the appended claims.

What is claimed is:

1. A method for controlling a vehicle's semi-active suspension system including a suspension coupled to a non-suspended mass, the method comprising:

detecting vehicle dynamic quantities during a ride of the vehicle;

using the detected dynamic quantities, determining an index of ride comfort and an index of roadholding;

applying a weight factor to the index of ride comfort and to the index of roadholding and, based on a Sky Hook control model, determining target damping force characteristics for the suspension of the suspension system that are suitable to substantially minimize vehicle body acceleration and to substantially minimize a variation of a force transmitted by the suspension to a road surface; and controlling the suspension to put respective damping force characteristics in accordance with the determined target damping force characteristics;

wherein the weight factor is calculated dynamically during the vehicle ride using the detected dynamic quantities; and wherein determining the target damping force characteristics includes minimizing a weighted sum of the vehicle body acceleration and of a variation of a force exerted by the non-suspended mass onto the road surface, the weighted sum being based on the dynamically calculated weight factor.

2. The method according to claim 1 wherein the weight factor is calculated using a fuzzy calculation performed on the detected vehicle dynamic quantities.

3. The method according to claim 2 wherein dynamically calculating the weight factor includes:

fuzzifying the detected vehicle dynamic quantities;

applying a prescribed set of fuzzy rules to the fuzzified quantities; and defuzzifying a result of said rules to obtain the weight factor.

4. The method according to claim 3, further comprising using the calculated weight factor to determine damping coefficients of the Sky Hook control model of the suspension.

5. The method according to claim 4 wherein determining damping coefficients of the Sky Hook control model of the suspension comprises determining a first damping coefficient of a first damper coupled between a wheel and a body of the vehicle, and determining a second damping coefficient of a second damper coupling the body of the vehicle to an inertial reference system, the first and second damping coefficients being related to each other by the calculated weight factor.

6. The method according to claim 5 wherein determining the first and second damping coefficients comprises keeping the second damping coefficient fixed, and determining the first damping coefficient on a basis of the calculated weight factor.

7. The method according to claim 5, further comprising calculating, on a basis of the first and second damping coefficients, a value of force to be exerted by the suspension onto the vehicle.

8. The method according to claim 7, further comprising determining, on a basis of the calculated value of force exerted by the suspension on the vehicle, drive signals for correspondingly controlling the suspension.

9. The method according to claim 1, further comprising dynamically calculating respective weight factors for each suspension of the suspension system.

10. An apparatus for controlling a vehicle's semi-active suspension system including a suspension coupled to a non-suspended mass, the apparatus including a control system adapted to receive detected vehicle dynamic quantities during the vehicle ride, the apparatus comprising:
  means for determining an index of ride comfort and an index of roadholding on a basis of the detected dynamic quantities;
  calculating means for applying a weight factor to the index of ride comfort and to the index of roadholding and, based on a Sky Hook control model, for determining target damping force characteristics for the suspension of the suspension system that are suitable to substantially minimize vehicle body acceleration and to substantially minimize a variation of a force transmitted by the suspension to a road surface; and
  control means for controlling the suspension to put respective damping force characteristics in accordance with the determined target damping force characteristics;
  wherein the calculating means dynamically calculates the weight factor during the vehicle ride using the detected dynamic quantities; and
  wherein the calculating means for determining the target damping force characteristics includes means for minimizing a weighted sum of the vehicle body acceleration and of a variation of a force exerted by the non-suspended mass onto the road surface, the weighted sum being based on the dynamically calculated weight factor.

11. The apparatus according to claim 10 wherein the calculating means comprises a fuzzy controller to dynamically calculate, on a basis of a prescribed set of fuzzy rules applied to the detected vehicle dynamic quantities, the weight factor.

12. The apparatus according to claim 11 wherein the calculating means receives the detected vehicle dynamic quantities, calculates the weight factor and determines, on a basis of the calculated weight factor, damping coefficients of the Sky Hook control model of the suspension.

13. The apparatus according to claim 11 wherein the calculating means comprises a computation unit to calculate, on a basis of the damping coefficients, a target value of force to be exerted by the suspension onto the vehicle, and a look-up table to determine, on a basis of the calculated target value of force, drive signals to correspondingly control the at least one suspension.

14. A semi-active vehicle suspension system coupled to a non-suspended mass, the system comprising:
  means for detecting dynamic quantities during a vehicle ride;
  means for determining an index of ride comfort and an index of roadholding on a basis of the detected dynamic quantities;
  calculating means for applying a weight factor to the index of ride comfort and to the index of roadholding and, based on a Sky Hook control model, for determining target damping force characteristics for a suspension of the suspension system that are suitable to substantially minimize vehicle body acceleration and to substantially minimize a variation of a force transmitted by the suspension to a road surface; and
  control means for controlling the suspension to put damping force characteristics of the suspension in accordance with the determined target damping force characteristics;
  wherein the calculating means dynamically calculates the weight factor during the vehicle ride using the detected dynamic quantities; and
  wherein the calculating means for determining the target damping force characteristics includes means for minimizing a weighted sum of the vehicle body acceleration and of a variation of a force exerted by the non-suspended mass onto the road surface, the weighted sum being based on the dynamically calculated weight factor.

15. The suspension system of claim 14 wherein the calculating means comprises a fuzzy controller to dynamically calculate, on a basis of a prescribed set of fuzzy rules applied to the detected vehicle dynamic quantities, the weight factor.

16. The suspension system of claim 15, further comprising exploiting genetic algorithms to optimize the fuzzy controller.

17. A method for a vehicle having a plurality of wheels, each of the plurality of wheels being coupled to the vehicle by a suspension having variable damping characteristics, the method comprising:
  measuring dynamic quantities associated with operation of the vehicle, including speed, vertical speed with respect to a surface upon which the vehicle is traveling, vertical speed with respect to each of the plurality of wheels, roll, pitch and turning angle;
  calculating a value for a weight factor for each of the plurality of wheels, using fuzzy computation;
  calculating an index of ride comfort and an index of road holding for each of the plurality of wheels;
  calculating a target damping characteristic for each of the plurality of suspensions using a Sky Hook control model, based, in part, upon the weight factor and the ride comfort and road holding indices, the target damping characteristics being suitable to substantially minimize vehicle body acceleration and to substantially minimize a variation of a force transmitted by the suspension to a road surface; and
  varying the damping characteristics of each of the plurality of suspensions according to respective calculated target damping characteristic,
  wherein calculating the target damping characteristics includes minimizing a weighted sum of the vehicle body acceleration and of a variation of a force exerted by the wheels onto the road surface, the weighted sum being based on the dynamically calculated weight factor.

18. A method for controlling a vehicle's semi-active suspension system having at least one suspension including a non-suspended mass and a spring between the non-suspended mass and a road surface, the method comprising:

detecting vehicle dynamic quantities during a ride of the vehicle;

using the detected dynamic quantities, calculating target damping force characteristics for the at least one suspension of the suspension system suitable to substantially minimize a vehicle body acceleration and to substantially minimize a variation of a force transmitted by the at least one suspension to the road surface, said calculating being based on a Sky Hook control model; and controlling the at least one suspension so as to put their respective damping force characteristics in accordance with the calculated target damping force characteristics, wherein said calculating target damping force characteristics include minimizing a weighted sum of the vehicle body acceleration and of the variation of the force exerted by the non-suspended mass onto the road surface, said weighted sum being based on weight factors, said weight factors being calculated dynamically during the vehicle ride using the detected dynamic quantities.

19. An apparatus for controlling a vehicle's semi-active suspension system including a suspension, the suspension having a non-suspended mass and a spring between the non-suspended mass and a road surface, the apparatus comprising:

a control system adapted to receive detected vehicle dynamic quantities during a ride of the vehicle, said control system having:

means for calculating target damping force characteristics for the at least one suspension of the suspension system based on a Sky Hook control model applied to the detected dynamic quantities, the target damping force characteristics being suitable to substantially minimize a vehicle body acceleration and to substantially minimize a variation of a force transmitted by the at least one suspension to the road surface; and control means for controlling the at least one suspension to put respective damping force characteristics of the at least one suspension in accordance with the calculated target damping force characteristics, wherein said means for calculating the target damping force characteristics include means for minimizing a weighted sum of the vehicle body acceleration and of a variation of a force exerted by the non-suspended mass onto the road surface, said weighted sum being based on weight factors, and said means for calculating the target damping force characteristics being structured to calculate the weight factors dynamically during the vehicle ride using the detected dynamic quantities.

* * * * *